(12) United States Patent
Wegner

(10) Patent No.: US 10,466,099 B2
(45) Date of Patent: Nov. 5, 2019

(54) SIGNAL GUIDES FOR SENSOR DEVICES

(71) Applicant: Scott David Wegner, Peachtree City, GA (US)

(72) Inventor: Scott David Wegner, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 81 days.

(21) Appl. No.: 15/235,939

(22) Filed: Aug. 12, 2016

(65) Prior Publication Data

US 2018/0012457 A1  Jan. 11, 2018

Related U.S. Application Data

(60) Provisional application No. 62/218,340, filed on Sep. 14, 2015.

(51) Int. Cl.
| | |
|---|---|
| *G08B 5/36* | (2006.01) |
| *G01J 1/42* | (2006.01) |
| *G01J 1/02* | (2006.01) |
| *G01J 1/44* | (2006.01) |

(52) U.S. Cl.
CPC ............. *G01J 1/42* (2013.01); *G01J 1/0271* (2013.01); *G01J 1/44* (2013.01)

(58) Field of Classification Search
CPC ...................................... G08B 5/36; G01J 1/42
See application file for complete search history.

(56) References Cited

U.S. PATENT DOCUMENTS

| | | | |
|---|---|---|---|
| 4,807,954 A * | 2/1989 | Oyamada | G02B 6/262 385/33 |
| 5,696,865 A | 12/1997 | Beeson | |
| 7,286,296 B2 | 10/2007 | Chaves et al. | |
| 9,681,520 B1 * | 6/2017 | Berry | H05B 37/0218 |
| 2010/0179417 A1 * | 7/2010 | Russo | A61M 39/08 600/424 |

(Continued)

FOREIGN PATENT DOCUMENTS

| | | |
|---|---|---|
| DE | 2020105104310 | 10/2015 |
| FR | 2971052 | 8/2012 |
| WO | WO 2014078426 | 5/2014 |

OTHER PUBLICATIONS

European Search Report for EP 17190153 dated Feb. 5, 2018.

*Primary Examiner* — Quan-Zhen Wang
*Assistant Examiner* — Rajsheed O Black-Childress
(74) *Attorney, Agent, or Firm* — King & Spalding LLP

(57) ABSTRACT

A signal guide for a sensor device is disclosed herein. The signal guide can include a base having a number of proximal apertures, where at least one of the proximal apertures is configured to be disposed proximate to at least one transceiver of the sensor device. The signal guide can also include a body disposed adjacent to the base, where the body includes at least one main channel, where the at least one main channel is configured to transmit at least one signal between the at least one main channel and the proximal apertures. The signal guide can further include a distal end disposed adjacent to the body opposite the base, where the distal end includes at least one distal aperture, where the at least one distal aperture is configured to transmit at least one signal between the a main channel and an ambient environment.

17 Claims, 9 Drawing Sheets

(56) References Cited

U.S. PATENT DOCUMENTS

| | | | |
|---|---|---|---|
| 2011/0211833 A1* | 9/2011 | Chen | H02J 9/06 398/45 |
| 2015/0099983 A1 | 4/2015 | Hatzilias | |
| 2016/0126950 A1* | 5/2016 | Lucantonio | H01R 13/6683 307/113 |
| 2016/0381757 A1* | 12/2016 | Chang | F21S 8/02 315/152 |

* cited by examiner

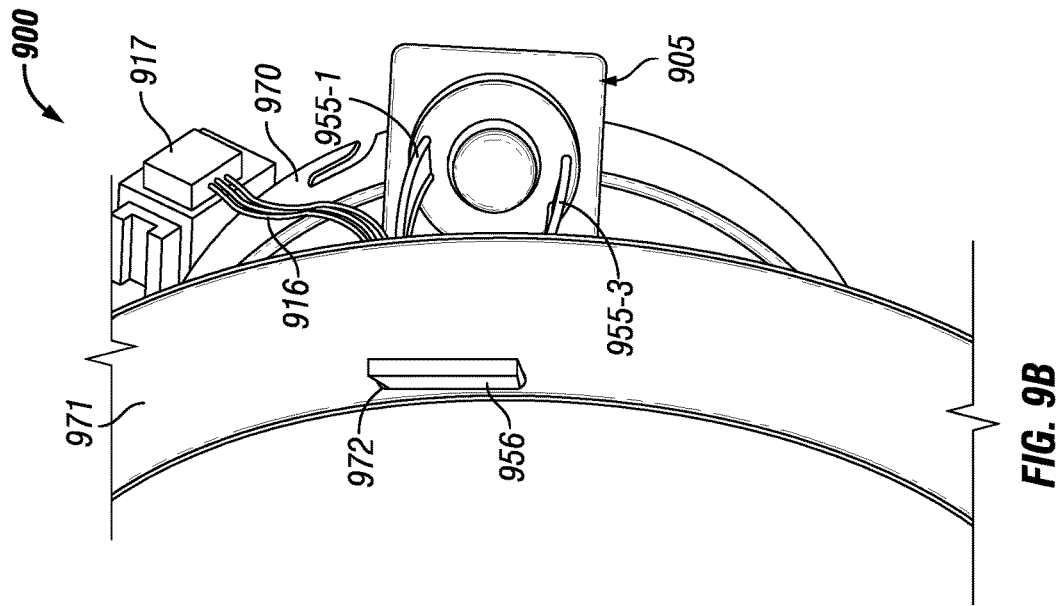
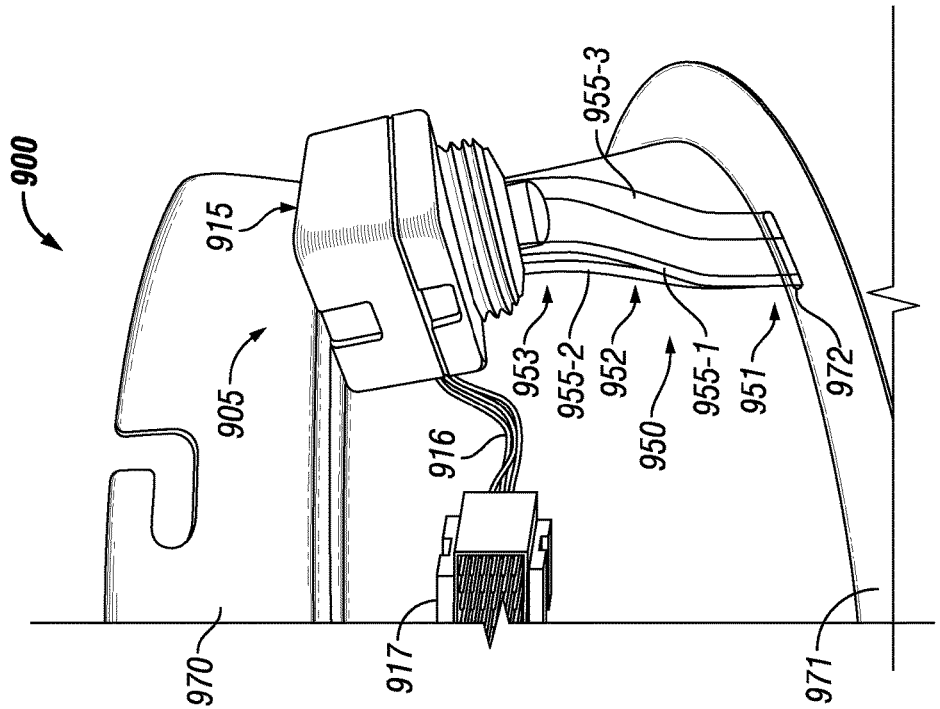
FIG. 9B
FIG. 9A

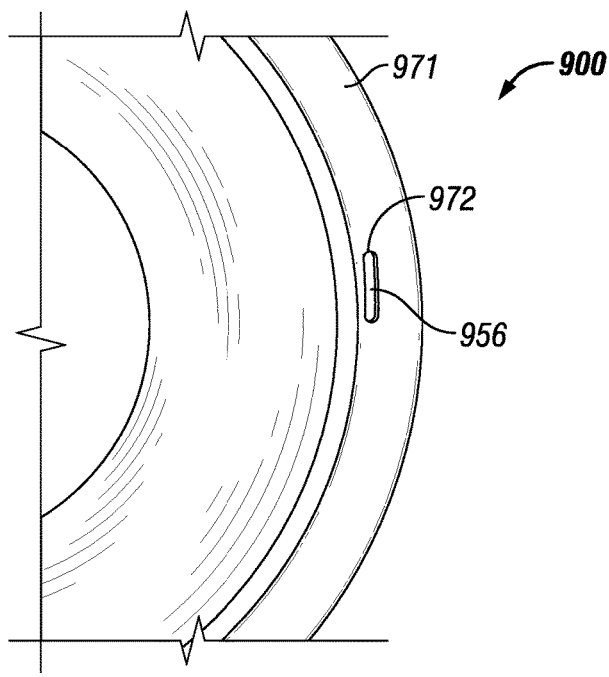
FIG. 9C
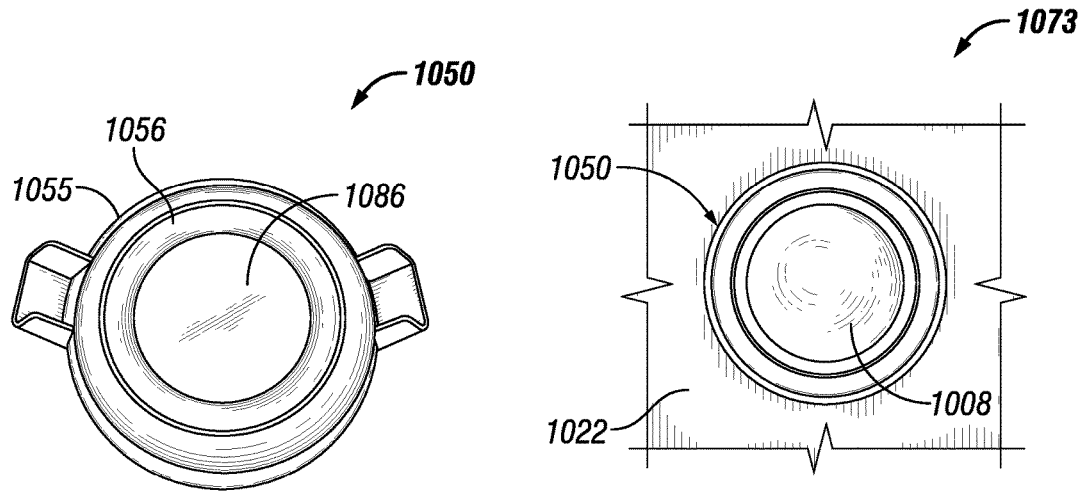
FIG. 10A      FIG. 10B

SIGNAL GUIDES FOR SENSOR DEVICES

CROSS-REFERENCE TO RELATED APPLICATIONS

This application claims priority under 35 U.S.C. § 119 to U.S. Provisional Patent Application Ser. No. 62/218,340, titled "Light Guides For Sensor Devices" and filed on Sep. 14, 2015, the entire contents of which are hereby incorporated herein by reference.

TECHNICAL FIELD

Embodiments described herein relate generally to sensor devices used in spaces, and more particularly to systems, methods, and devices for signal guides for sensor devices.

SUMMARY

In general, in one aspect, the disclosure relates to a signal guide for a sensor device. The signal guide can include a base having a number of proximal apertures, wherein at least one of the proximal apertures is configured to be disposed proximate to at least one transceiver of the sensor device. The signal guide can also include a body disposed adjacent to the base, where the body includes at least one main channel, where the at least one main channel is configured to transmit at least one signal between the at least one main channel and the plurality of proximal apertures. The signal guide can further include a distal end disposed adjacent to the body opposite the base, where the distal end includes at least one distal aperture, where the at least one distal aperture is configured to transmit at least one signal between the at least one main channel and an ambient environment.

In another aspect, the disclosure can generally relate to a sensor device subassembly. The sensor device subassembly can include a sensor having at least one transceiver, and a signal guide disposed adjacent to the at least one transceiver. The signal guide can include a base having a number of proximal apertures, where at least one of the proximal apertures is disposed proximate to the at least one transceiver of the sensor. The signal guide can also include a body disposed adjacent to the base, where the body includes at least one main channel, where the at least one main channel is configured to transmit at least one signal between the at least one main channel and the plurality of proximal apertures. The signal guide can further include a distal end disposed adjacent to the body opposite the base of the signal guide, where the distal end comprises at least one distal aperture, where the at least one distal aperture is configured to transmit the at least one signal between the at least one main channel and an ambient environment.

In yet another aspect, the disclosure can generally relate to a sensor device that includes a first sensor having a first transceiver, and a second sensor having a second transceiver. The sensor device can also include a signal guide disposed adjacent to the first transceiver and the second transceiver. The signal guide can include a base having a first proximal aperture and a second proximal aperture, where the first proximal aperture is disposed proximate to the first transceiver of the first sensor, and where the second proximal aperture is disposed proximate to the second transceiver of the second sensor. The signal guide can also include a body disposed adjacent to the base, where the body includes a first main channel and a second main channel, where the first main channel is adjacent to and contiguous with the first distal aperture, where the second main channel is adjacent to and contiguous with the second distal aperture. The signal guide can further include a distal end disposed adjacent to the body opposite the base, where the distal end includes a first distal aperture and a second distal aperture, where the first distal aperture is adjacent to and contiguous with the first main channel, and where the second distal aperture is adjacent to and contiguous with the second main channel. The sensor device can further include an operational device having a device aperture, where the distal end of the signal guide is disposed adjacent to the device aperture.

These and other aspects, objects, features, and embodiments will be apparent from the following description and the appended claims.

BACKGROUND

Sensor devices are used in a variety of applications. For example, sensor devices are used for energy management. In such a case, the sensor device can be placed in a space (e.g., a room) and can measure one or more of a number of parameters within the space. Such parameters can include, but are not limited to, an amount of ambient light and movement. Thus, a sensor device can include one or more of a number of sensors. Examples of sensors that are included in a sensor device can include, but are not limited to, a photo sensor and an infrared detector.

Sensor devices can also receive communication data from a control device (wall switch, handheld controller) of a user using any of a number of signal technologies (e.g., infrared, visible light). In addition, or in the alternative, a sensor device can include one or more of a number of other components. For example, a sensor device can include an indicating light to let a user know whether the sensor device is operating properly. As a result, a sensor device can have a significant footprint when mounted on a surface (e.g., a ceiling of a room, a wall of a room) or on an electrical device (e.g., a light fixture).

BRIEF DESCRIPTION OF THE DRAWINGS

The drawings illustrate only example embodiments of signal guides for sensor devices and are therefore not to be considered limiting of its scope, as signal guides for sensor devices may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 9A-9C show a light fixture with a sensor device having a signal guide in accordance with certain example embodiments.

FIGS. 10A and 10B show another sensor device with a signal guide in accordance with certain example embodiments.

DETAILED DESCRIPTION OF EXAMPLE EMBODIMENTS

Figure 1A:
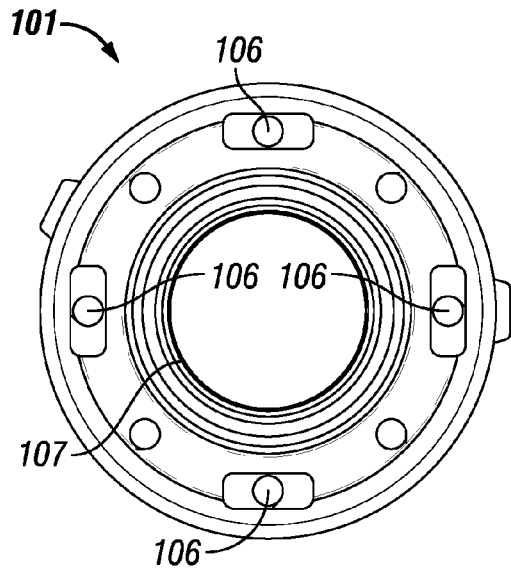
FIGS. 1A-1C show various portions of a sensor device currently known in the art.
Figure 1C:
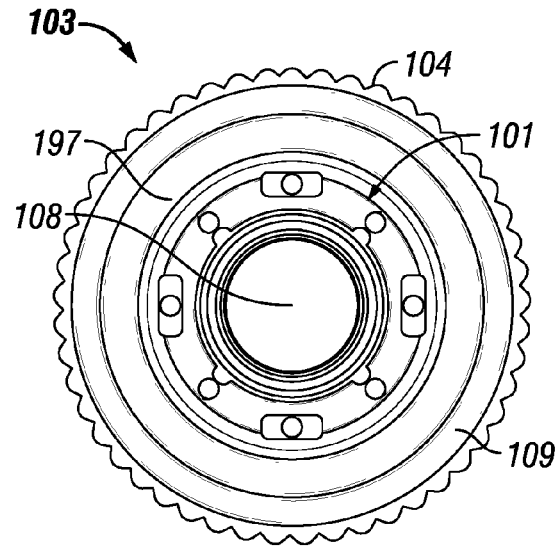
Figure 1B:
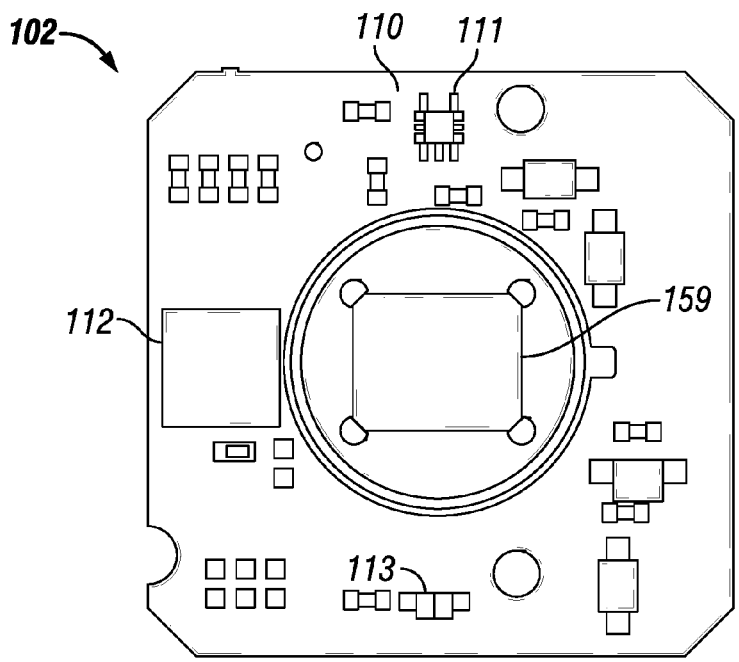

The example embodiments discussed herein are directed to systems, apparatuses, and methods of signal guides for sensor devices. While example embodiments described herein are directed to use with lighting systems, example embodiments can also be used in systems having other types of devices. Examples of such other systems can include, but are not limited to, security systems, fire protection systems, and emergency management systems. Thus, example embodiments are not limited to use with lighting systems.

Example signal guides are designed to transmit a signal from a source (e.g., a light source) to some point (e.g., a sensor device, a volume of space in a room) with minimal distortion and minimal loss. While example embodiments described herein are directed for use with light waves (e.g., visible light waves, infrared waves), example embodiments can be used with any of a number of other signal types. Examples of such other types of signals that can be transmitted through example signal guides described herein can include, but are not limited to, microwaves, radio frequency waves, electromagnetic waves, ultraviolet waves, energy waves, sound waves, control signals, data signals, and images. Example signal guides (or portions thereof) can be made of one or more of a number of materials (e.g., metal, plastic, rubber, ceramic, glass, acrylic resin, polycarbonate, epoxy) to allow the signal guides to perform the functions described herein. In some cases, at least a portion of the signal guide includes a reflective material.

As described herein, a user can be any person that interacts with sensor devices that include example signal guides. Examples of a user may include, but are not limited to, a consumer, an electrician, an engineer, a mechanic, an instrumentation and control technician, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure. For example, features shown in one or more figures or described with respect to one embodiment can be applied to another embodiment associated with a different figure or description.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In certain example embodiments, a light fixture or other device that includes one or more sensor devices that use example signal guides (or portions thereof) described herein can meet one or more of a number of standards, codes, regulations, and/or other requirements established and maintained by one or more entities. Examples of such entities include, but are not limited to, Underwriters' Laboratories (UL), the Institute of Electrical and Electronics Engineers (IEEE), International Electrotechnical Commission (IEC) and the National Fire Protection Association (NFPA). For example, wiring (the wire itself and/or the installation of such wire) that electrically couples a sensor devices that includes an example signal guide with a light fixture may fall within one or more standards set forth in the National Electric Code (NEC). In such a case, the NEC defines Class 1 circuits and Class 2 circuits under various Articles, depending on the application of use.

Example embodiments of signal guides for sensor devices will be described more fully hereinafter with reference to the accompanying drawings, in which example embodiments of signal guides for sensor devices are shown. Signal guides for sensor devices may, however, be embodied in many different forms and should not be construed as limited to the example embodiments set forth herein. Rather, these example embodiments are provided so that this disclosure will be thorough and complete, and will fully convey the scope of signal guides for sensor devices to those of ordinary skill in the art. Like, but not necessarily the same, elements (also sometimes called components) in the various figures are denoted by like reference numerals for consistency.

Terms such as "first", "second", "top", "bottom", "side", "input", "output", "main", "inner", "outer", "base", "proximal", and "distal" are used merely to distinguish one component (or part of a component or state of a component) from another. Such terms are not meant to denote a preference or a particular orientation, and are not meant to limit embodiments of signal guides for sensor devices. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2A:
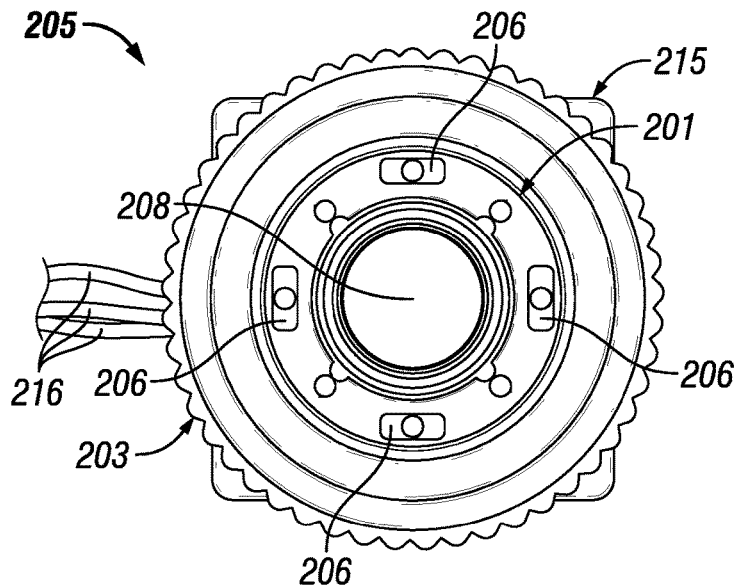
FIGS. 2A and 2B show a sensor device currently known in the art.
Figure 2B:
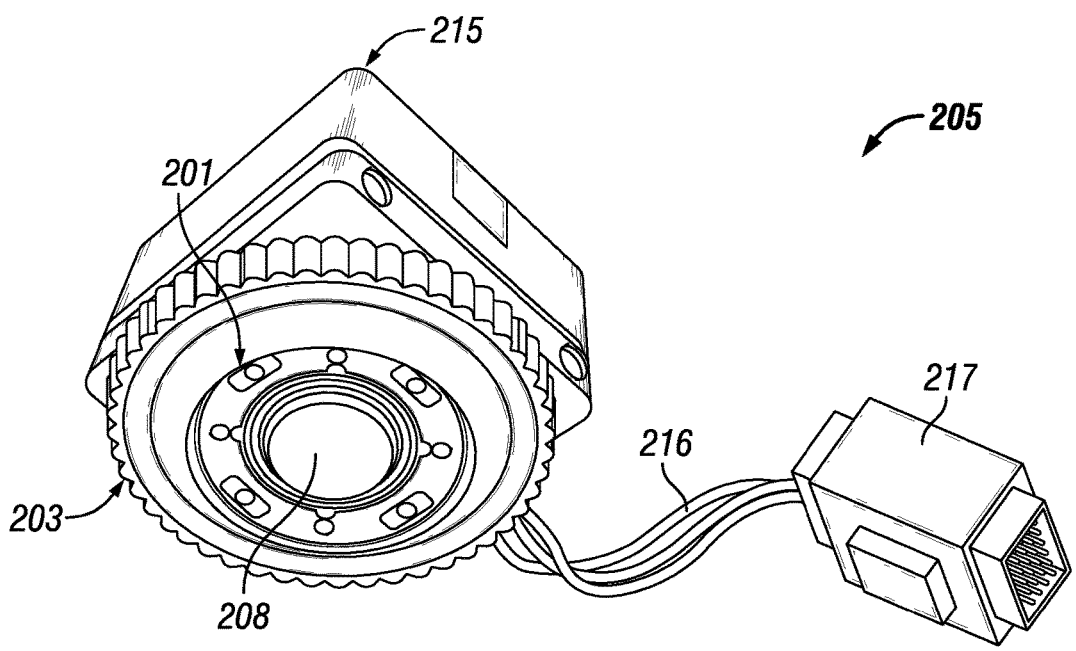

FIGS. 1A-2B show various portions of a sensor device 205 currently known in the art. Specifically, FIG. 1A shows a top view of a cover 101 of the sensor device 205. FIG. 1B shows a top view of a circuit board assembly 102 of the sensor device 205. FIG. 1C shows a top view of a distal assembly 103 of the sensor device 205. FIG. 2A shows a top view of the sensor device 205, and FIG. 2B shows a top-side perspective view of the sensor device 205. The cover 101 is part of the sensor device 205 currently known in the art.

With example embodiments, described below, a cover can be part or, or a separate component from, a sensor device.

Referring to FIGS. 1A-2B, the circuit board assembly 102 is disposed within the housing 215 of the sensor device 205. The circuit board assembly 102 can include a circuit board 110 on which are disposed one or more of a number of components. Examples of such components can include, but are not limited to, a resistor, a capacitor, an integrated circuit, an occupancy sensor 159 (also called, for example, a passive infrared detector 159), a photo sensor 111, an infrared detector 112 (also called, for example, an infrared receiver 112), and a light-emitting diode (LED) 113. For purposes of this application, each of the components that receives a signal (in this case, the photo sensor 111 and the infrared detector 112) can be called, or can include, an input element. The LED 113 emits light. A sensor can also include one or more other components, including but not limited to a transducer, which converts one form of energy (e.g., a signal) to another.

The housing 215 of the sensor device 205 is disposed adjacent to the distal assembly 103. The distal assembly 103 includes an inner body 197 and a trim 104 that is movably (e.g., threadably) coupled to the inner body 197. The trim 104 can be used to hold one or more components of the sensor device 205 in place. For example, the trim 104 can be used to retain the cover 101. The cover 101 includes a number of holes 106 that are each substantially aligned with a sensor (e.g., photo sensor 111, infrared detector 112, LED 113) disposed on the circuit board 110. In this example, the cover 101 has four holes 106 (three of which are actually used) that are located at different points around the aperture 107 disposed in the middle of the cover 101.

As a result of the configuration of covers known in the art, such as cover 101 of FIGS. 1A-2B, the footprint of the sensor device 205 can be large and protruding. In addition, the number of features of the sensor device 205 that are visible to a user can be high. Consequently, some sensor devices currently used in the art, such as sensor device 205, can lack in aesthetic appeal. The sensor device 205 can include an electrical connector end 217 that is configured to couple to a complementary electrical connector end of an electrical device. One or more electrical conductors 216 can be used to electrically couple the components of the circuit board assembly 102 to the electrical connector end 217. The occupancy sensor housing 108 (e.g., a receiver) of the distal assembly 103 is disposed within the aperture 107 that traverses the center of the cover 101.

Figure 3B:
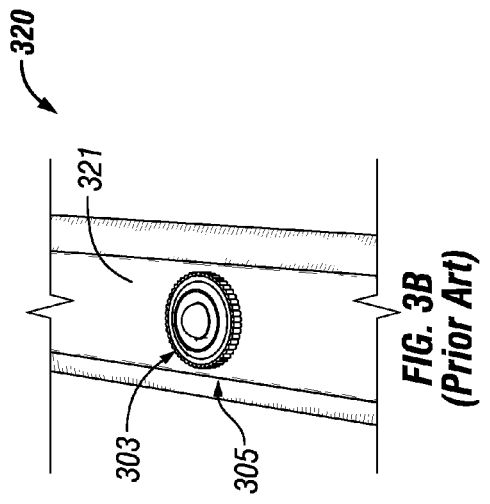
FIGS. 3A and 3B show a light fixture with a sensor device currently known in the art.
Figure 3A:
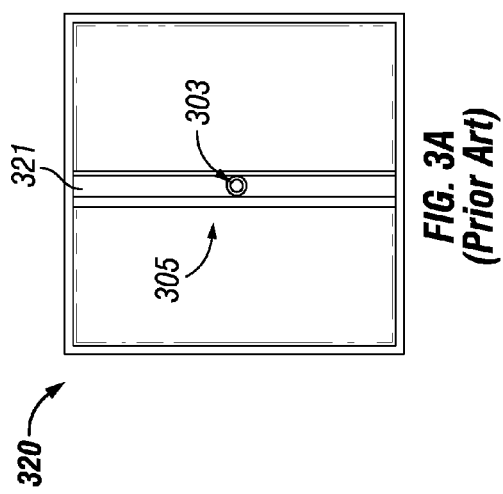
Figure 4B:
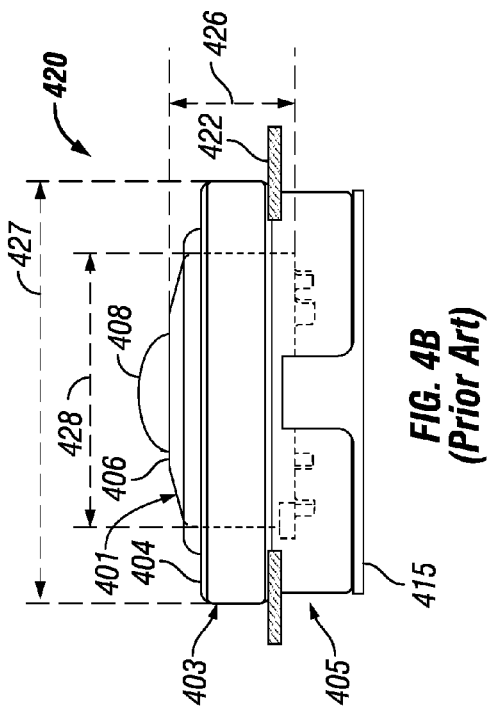
FIGS. 4A and 4B show another light fixture with a sensor device currently known in the art.
Figure 4A:
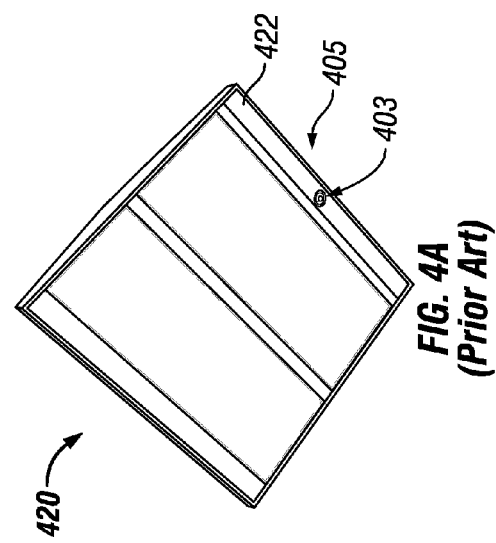

A sensor device currently used in the art can be mounted in any of a number of places relative to an electrical device (e.g., a light fixture). For example, FIGS. 3A-4B show examples of how a sensor device currently used in the art can be integrated with an electrical device. Specifically, FIG. 3A shows a bottom view of an electrical device 320 (in this case, a light fixture) having a sensor device 305 disposed on a center panel 321. FIG. 3B shows a bottom-side perspective view that details the sensor device 305 of FIG. 3A disposed on the center panel 321. FIG. 4A shows a bottom-side perspective view of another electrical device 420 (also a light fixture in this case) having a sensor device 405 disposed on an outer panel 422. FIG. 4B shows a cross-sectional side view that details the sensor device 405 of FIG. 4A disposed on the outer panel 422.

The sensor device 305 of FIGS. 3A and 3B and the sensor device 405 of FIGS. 4A and 4B are substantially the same as the sensor device 205 of FIGS. 1A-2B. Referring to FIGS. 1A-4B, the distal assembly 303 of the sensor device 305 of FIGS. 3A and 3B and the digital assembly 403 of the sensor device 405 of FIGS. 4A and 4B are visible to a user. As FIGS. 3A-4B show, the footprint of the distal assembly 303 and the distal assembly 403 is large relative to the size of the rest of the electrical device 320 and the electrical device 420, respectively.

As shown in FIG. 4B, the trim 404 of the distal assembly 405 is used to secure the rest of the distal assembly 405 to the outer-facing surface of the outer panel 422 and to secure the housing 415 to the inner-facing surface of the outer panel 422. The trim 404 has a width 427 (e.g., 1.3 inches) and a height (which can be substantially similar to the height 426 of the cover 401). The cover 401 also has a width that is less than the width 427 of the trim 404. In some cases, the shape and/or size of portions of a sensor device currently known in the art that would be visible to a user are so large that they cannot be used with certain electrical devices.

When a sensor device 405 is relatively small (e.g., trim 404 with a width 427 of less than 1.5 inches), the sensor device 405 can be called a mini sensor device (or, more simply, a mini sensor). While the examples shown in the figures are directed to mini sensor devices, example embodiments can be used with sensor devices of any size, including relatively large sensor devices.

Figures 5A, 5B:
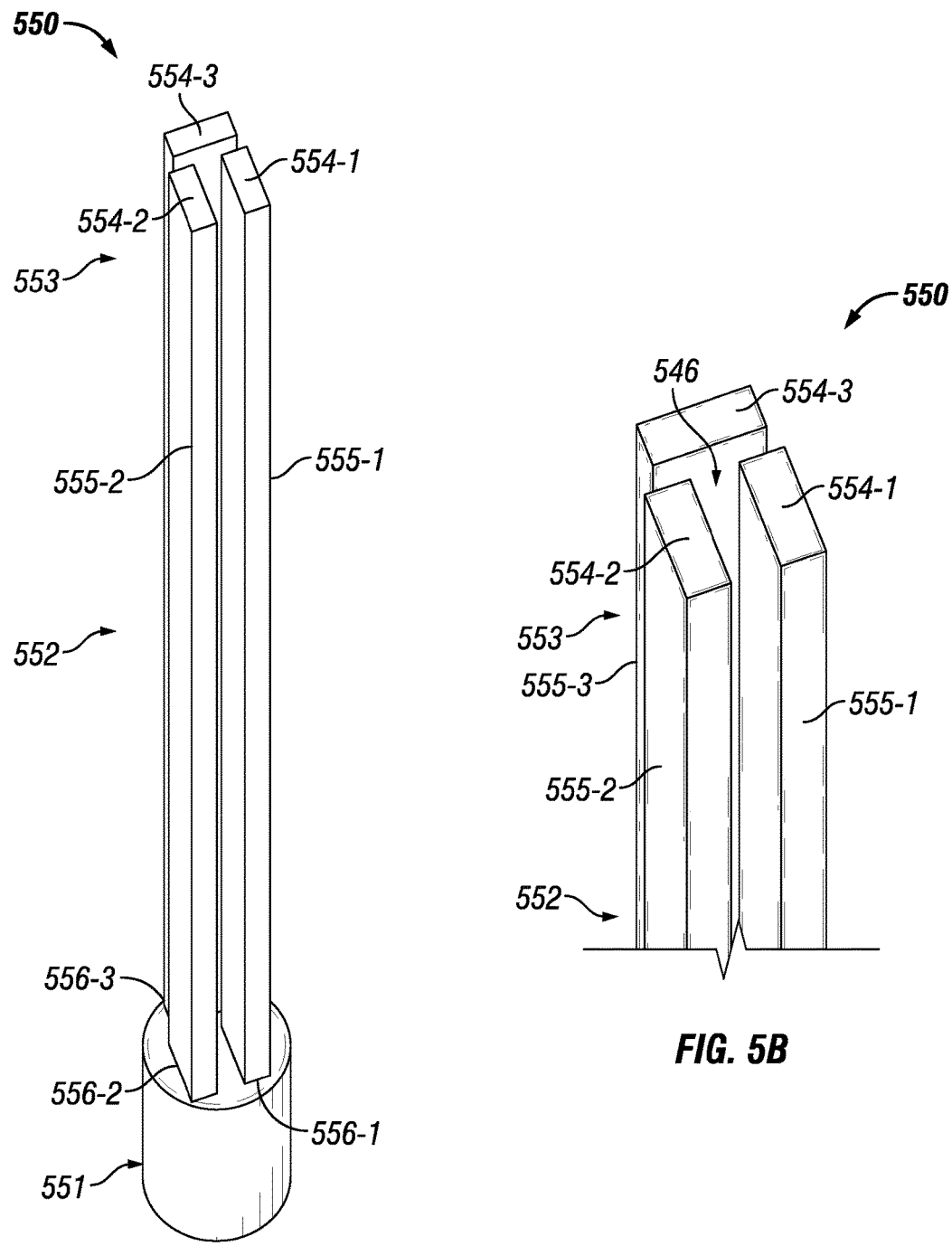
FIGS. 5A and 5B show a signal guide for a sensor device in accordance with certain example embodiments.

Example embodiments can allow the sensor device to be located completely behind (as opposed to only partially behind) a surface. In other words, example embodiments can allow a sensor device to be substantially hidden from view of a user. Such example embodiments are shown with respect to FIGS. 5A-9C. Referring to FIGS. 1A-9C, FIGS. 5A and 5B show a first example embodiment of a signal guide 550. Specifically, FIG. 5A shows a bottom-side perspective view of the signal guide 550 for a sensor device in accordance with certain example embodiments. FIG. 5B shows a detailed bottom-side perspective view of a distal end of the signal guide 550 of FIG. 5A.

In this case, the signal guide 550 has a base 553 that is configured to be disposed proximate to a component (e.g., a trim) of an electrical device (e.g., a light fixture) for which the sensor device is used. At the opposite end of the signal guide 550, there are three proximal apertures 554 (proximal aperture 554-1, proximal aperture 554-2, and proximal aperture 554-3) that are configured to be disposed adjacent to one or more transceivers mounted on the circuit board assembly of the sensor device. A proximal aperture 554 can define a proximal end of a main channel 555. In example embodiments, a sensor of a sensor device can send and/or receive signals, and so a transceiver replaces the input element and the output element of a sensor described above with respect to FIGS. 1A-4B. The proximal apertures 554 of the signal guide 550 of FIGS. 5A and 5B can be part of one or more channels, where each channel is disposed within a body 552 (e.g., body 552-1, body 552-2) that extends from and is coupled to the proximal end of the base 553. Each body 552 can have a distal end coupled to the base 553 and include a distal aperture 556 that receives an energy (e.g., light, sound) wave or other type of signal from a transceiver also called a transceiver element herein) through the proximal aperture 553 and the main channel 555, and send the signal through the base 553. A distal aperture 556 can define a distal end of a main channel 555. In addition, or in the alternative, the distal aperture 556 can transmit an energy wave (or other type of signal) that is received from the base 553, and transmits the signal through the main channel 555 and the proximal aperture 554 to the transceiver element of a sensor device.

The base 553 can be configured so that energy waves or other signals emitted by a transceiver of a sensor can be directed in some way to the distal apertures 556 of a channel of the signal guide 550. Alternatively, one or more distal apertures 556 can be incorporated within or at a distal end of the base 553. In such a case, a channel can extend into the base 553 to a point where the associated distal aperture 556 is located within the base 553.

In addition, each channel can have a proximal end 553 with a proximal aperture 554, where the proximal end 553 is disposed at the end of the body 552 opposite the base 553. Each proximal aperture 554 can transmit an energy wave or other type of signal that originates from a transceiver element and is transmitted through the main channel 555 and the distal aperture 556 to the base 553. In addition, or in the alternative, the proximal aperture 554 can receive an energy wave or other type of signal from an ambient environment (received through the base 553, the distal aperture 556, and the main channel 555) and transmit the energy wave or other type of signal to the transceiver element of a sensor device. Each body 552 can include a main channel 555 that runs between the proximal aperture 554 at the base 553 and the distal aperture 556 of the distal end 551. The signal guide 550 can have any of a number of channels. In this case, the signal guide 550 has three segments or channels, where each segment (or portion thereof) is designated by a "-#" at the end of each numerical designation. For example, the proximal aperture of segment 3 has a numerical designation of 554-3. A segment can have a single channel (e.g., one proximal aperture 554, one main channel 555, and one distal aperture 556) running therethrough that is devoted the transfer of energy waves or other types of signals with a single sensor. Alternatively, a segment can have multiple channels (e.g., four proximal apertures 554, four main channels 555, and two distal apertures 556) running therethrough, where each channel (or portion thereof) is dedicated to a single sensor device or multiple sensor devices.

In certain example embodiments, when the signal guide 550 has multiple channels, one or more of the channels is physically separated from the remainder of the segments. In such a case, a gap 546 exists between the segments. Alternatively, when there is no physical separation in the space within a distal end 551 (e.g., distal end 551-2), a body 552 (e.g., body 552-1), and or a base 553 (e.g., base 553-3) of the signal guide 550, the channel 555 (e.g., channel 555-2) can be used to transmit one or more signals from/to one or more transceiver elements of one or more sensors. If the channel 555 is used to transmit signals to/from multiple transceiver elements, then the channel 555 can be a single open space or multiple spaces within the channel 555 that are physically separated from each other. Using the example signal guide 550, the only part of a sensor device that would be visible to a user are the outlet channels 556 of the signal guide 550. As a result, the footprint (and in particular the visible footprint) of the sensor device can be significantly decreased relative to the footprint of sensor devices currently known in the art. In such a case, the proximal apertures 554 of the base 553 can redirect energy waves or other types of signals emitted by transceivers that are spread out in the housing of the sensor device to the main channels 555 and on to the distal apertures 556, which are spaced relatively close together.

The various characteristics (e.g., cross-sectional shape, cross-sectional size, overall shape, overall size, vertical length, overall length, number of proximal apertures, number of main channels, number of distal apertures) of the signal guide 550 (or any portion thereof) can vary. For example, in this case, the cross-sectional shape of the main channels 555 of the signal guide 550 is rectangular and substantially uniform in shape and size along the entire length of the body 552. This makes each main channel 555 appear as an extruded rectangle. Examples of the cross-sectional shape of a channel, including the main channel 555, the distal aperture 556, and/or the proximal aperture 554, can include, but are not limited to, circular, square, triangular, hexagonal, and irregular.

The cross-sectional shape and/or size of a channel (in this case, the main channel 555, the distal aperture 556, and the proximal aperture 554) can vary along its length. Also, the cross-sectional shape and/or size of one channel can be the same as, or different than, the cross-sectional shape and/or size of one or more other channels of the signal guide 550. Also, while the main channel 555, the distal aperture 556, and the proximal aperture 554 of the signal guide 550 of FIGS. 5A and 5B are substantially linear and parallel to each other, one or more of the channels can be non-linear along their length, and/or one or more of the channels can be non-linear with respect to each other.

In addition, or in the alternative, the cross-sectional shape and/or size of a body 552 can vary along its length. Also, the cross-sectional shape and/or size of one body 552 can be the same as, or different than, the cross-sectional shape and/or size of one or more other bodies 552 of the signal guide 550. Similarly, the cross-sectional shape and size of the base 553 can vary. Also, while the body 552 and the base 553 of the signal guide 550 of FIGS. 5A and 5B are substantially linear and parallel to each other, one or more of the bodies 552 and/or the base 553 can be non-linear along their length, and/or one or more of the bodies 552 and the base 553 can be non-linear with respect to each other. In this case, the channels and the corresponding portions (e.g., body 552, base 553, distal end 551) of the signal guide 550 in which the channel is disposed have substantially the same cross-sectional shape.

Figure 6:
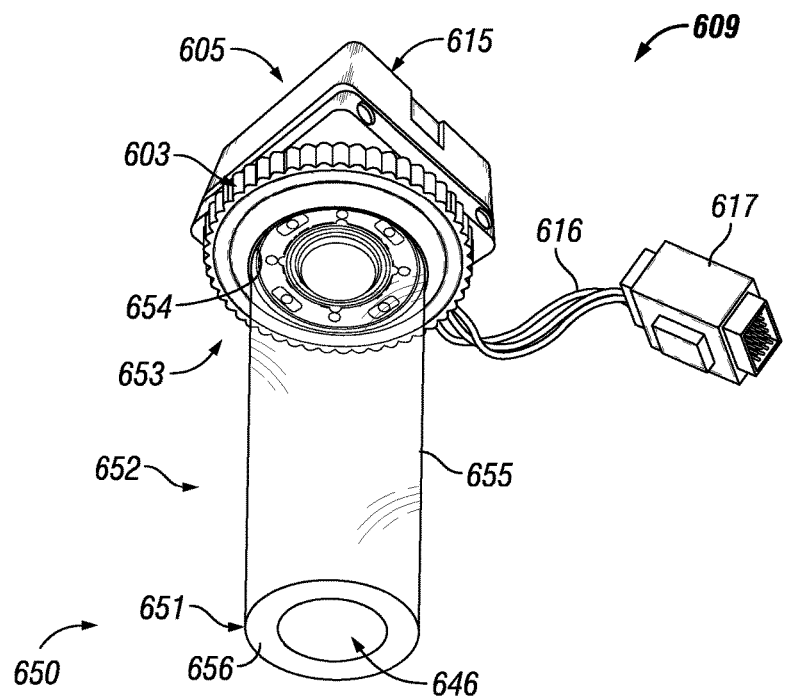
FIG. 6 shows another signal guide for a sensor device in accordance with certain example embodiments.

FIG. 6 shows another example embodiment. Specifically, FIG. 6 shows a bottom-side perspective view of a sensor device 605 that includes another signal guide 650 in accordance with certain example embodiments. The sensor device 605 is substantially similar to the sensor devices (e.g., sensor device 205) described above, except for the signal guide 650. The signal guide 650 of FIG. 6 can be substantially similar to the signal guide 550 of FIGS. 5A and 5B, except as described below. In this case, the example signal guide 650 is cylindrical in shape with a cavity 646 that traverse the length of the signal guide 650 through the middle of the cylinder. The signal guide 650 of FIG. 6 can include a proximal end that includes at least one proximal aperture 654. The proximal aperture 654 can be continuous along the surface of the base 653. Alternatively, there can be a number of discrete proximal apertures 654 along the surface of the base 653. The proximal aperture(s) 654 can be disposed proximate to the transceivers of the sensor device 605.

The signal guide 650 can also include a distal end 651 that includes one or more distal apertures 656. The distal aperture 656 can be continuous along the surface of the distal end 651. Alternatively, there can be a number of discrete distal apertures 656 along the surface of the distal end 651. In addition, the signal guide 650 can include a body 652 that is disposed between the distal end 651 and the base 651. The body 652 can have one or more main channels 655 disposed therein. When there are multiple channels 655, those channels can be physically separated from each other. Alternatively, when there is no physical separation in the space within the distal end 651, the body 652, and or the base 653 of the signal guide 650, the channel 655 can be used to transmit one or more signals from/to one or more transceiver elements of one or more sensors. The main channels 655 provide continuity between a proximal aperture 654 and a distal aperture 656.

In certain example embodiments, the only part of the sensor device 605 and the signal guide 650 that would be visible to a user is the outlet channel 656 of the signal guide 650. As a result, the footprint of the sensor device 605 can be significantly decreased relative to the footprint of sensor devices currently known in the art. In this example, the cross-sectional shape of the signal guide 650 is circular and substantially uniform in shape and size along its entire length. The cross-sectional shape and/or size of the signal guide 650 (or any portion thereof) can vary along its length. For example, the cross-sectional shape of the signal guide 650 (or any portion thereof) can be rectangular, square, triangular, or irregular. Also, while the signal guide 650 of FIG. 6 is substantially linear along its length, the signal guide 650 can be non-linear along its length.

Figure 7A:
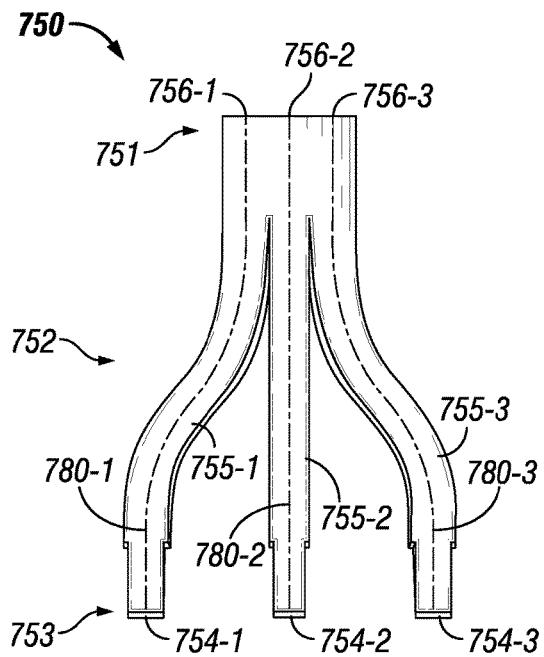
FIGS. 7A and 7B show yet another signal guide for a sensor device in accordance with certain example embodiments.

FIGS. 7A-9C show other example embodiments of sensor guides. Specifically, FIG. 7A shows a side view of a flattened signal guide 750 for a sensor device in accordance with certain example embodiments. FIG. 7B shows a bottom-side perspective view of the signal guide 750 of FIG. 7A that is shaped. FIGS. 8A and 8B each show a bottom-side perspective view of a sensor device 805 that includes a signal guide 850 in accordance with certain example embodiments. FIGS. 9A-9C show an electrical device 900 that includes a sensor device 905 (substantially similar to the sensor devices described above) with a signal guide 950 in accordance with certain example embodiments.

The signal guide 850 of FIGS. 8A and 8B, the signal guide 750 of FIGS. 7A and 7B, and the signal guide 950 of FIGS. 9A-9C can be substantially similar to the signal guide 550 of FIGS. 5A and 5B and the signal guide 640 of FIG. 6, as well as to each other, except as described below. In addition, aside from the signal guides, the sensor device 805 of FIGS. 8A and 8B and the sensor device 905 of FIGS. 9A-9C are substantially the same as the sensor devices described above. Referring to FIGS. 1A-9C, the signal guide 750 of FIGS. 7A and 7B has a base 753 that is configured to be disposed proximate to the circuit board assembly. Specifically, the base 753 at the proximal end of the signal guide 750 can be disposed adjacent to one or more of the transceivers mounted on the circuit board assembly of the sensor device. In this case, the base 753 has a number of proximal apertures 754, where each proximal aperture (e.g., 754-1) is placed adjacent to a transceiver of the sensor device and receives an energy (e.g., light, sound) wave from the transceiver.

The signal guide 750 can also include a body 752, located between the base 753 and the distal end 751 of the signal guide 750, where the body includes one or more segments that extend from the base 753. Each segment can have a main channel 755 that extends from the corresponding proximal aperture 754 of the base 753. At the distal end 751 of the body 752 of the signal guide 750, one or more of the main channels 755 merge to form one or more distal apertures 756. In this case, the base 753 of the signal guide 750 has three proximal apertures 754 and three main channels 755, where each proximal aperture 754 and corresponding main channel 755 is designated by a "-#" at the end of each numerical designation. For example, the second proximal aperture has a numerical designation of 754-2.

A proximal aperture 754, a main channel 755, and a distal aperture 756 can form a single continuous channel 780. In this case, proximal aperture 754-1, main channel 755-1, and distal aperture 756-1 forms channel 780-1; proximal aperture 754-2, main channel 755-2, and distal aperture 756-2 forms channel 780-2; and proximal aperture 754-3, main channel 755-3, and distal aperture 756-3 forms channel 780-3. A continuous channel 780 can remain isolated from any other channel 780 of the signal guide 750 along the entire length of the channel 780. Alternatively, a portion (e.g., the distal aperture 756) of a channel 780 can be shared with a corresponding portion of another channel 780 of a signal guide 750. When multiple main channels 755 merge at the distal end 751, the merger can result in a single distal aperture 756. Alternatively, the merger of multiple main channels 755 at the distal end 751 of the signal guide 750 can result in a more consolidated configuration of the multiple main channels 755 to form the same number of multiple distal apertures 756 at the distal end 751. For example, in this case, distal aperture 756-1, distal aperture 756-2, and distal aperture 756-3, which correspond to main channel 755-1, main channel 755-2, and main channel 755-3, respectively, are located adjacent to each other in a line at the distal end 751 of the signal guide 750 of FIGS. 7A and 7B.

Figure 7B:
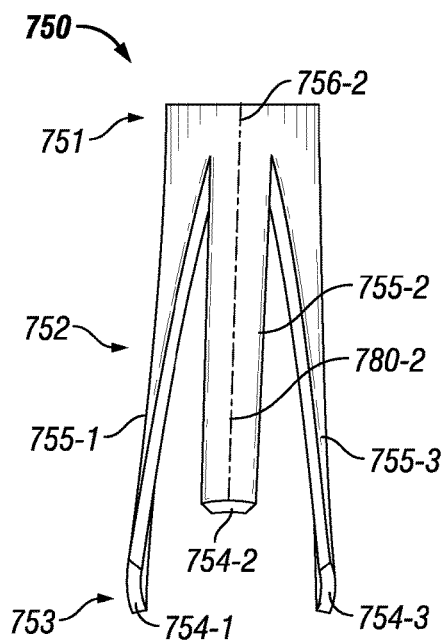
Figure 8A:
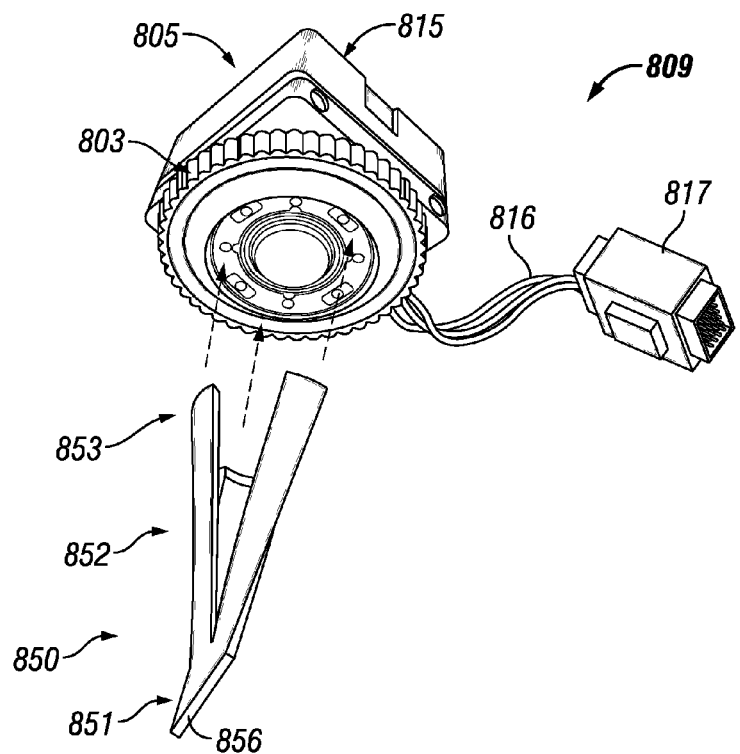
FIGS. 8A and 8B show a sensor device with a signal guide in accordance with certain example embodiments.
Figure 8B:
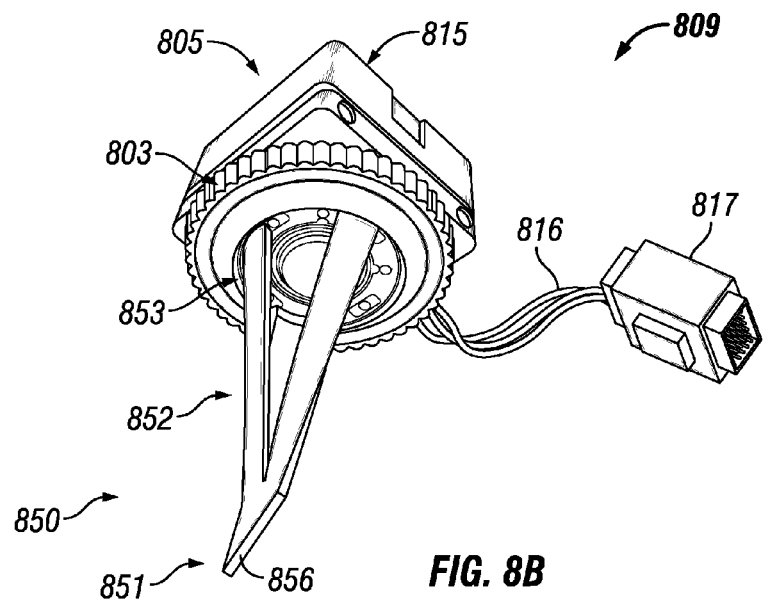

The signal guide 850 of FIGS. 8A and 8B is substantially the same as the shaped signal guide 750 of FIG. 7B. In FIGS. 8A and 8B, the subsystem 809 includes a signal guide 850 and a sensor device 805. The distal end 851 of the signal guide 850 is shown as having a single distal aperture 856. Alternatively, signal guide 850 can have multiple distal apertures 856. For example, there can be one distal aperture 856 for each main channel 855, where the multiple distal apertures 856 are aligned in a row so that the distal end 851 of the signal guide 850 forms a linear segment.

The signal guide 950 of FIGS. 9A-9C is substantially the same as the signal guide 850 of FIGS. 8A and 8B, except that the main channels (main channel 955-1, main channel 955-2, and main channel 955-3) of the body 952 have more curvature than the main channels of the body of the signal guide 850. In FIGS. 9A-9C, all of the sensor device 905, including the signal guide 950, is located behind the trim 971 of the electrical device 900. Further, the distal aperture 956 of the signal guide 950 is disposed within a slot 972 that traverses the trim 971 of the electrical device 900. The shape and size of the slot 972 can be substantially the same as the shape and size of the distal aperture 956. As a result, none of the sensor device 900 except for the outlet channel 956 is visible by a user when the electrical device 900 is installed.

The example shown in FIGS. 9A-9C highlights the advantages of example embodiments. First, the size of the sensor device 900 is much less relevant because the sensor device 900 is located where substantial space exists. Consequently, a sensor device 900 of any size (and having any of a number of transceivers) can be used with the electrical device 900. Second, none of the sensor device 900 is visible by a user when the electrical device is installed, and so there are no issues with aesthetics. Finally, example signal guides, such as signal guide 950, can be bi-directional, allowing energy waves to flow both from a transceiver and to a transceiver (or some other component of the electrical device).

Figure 11:
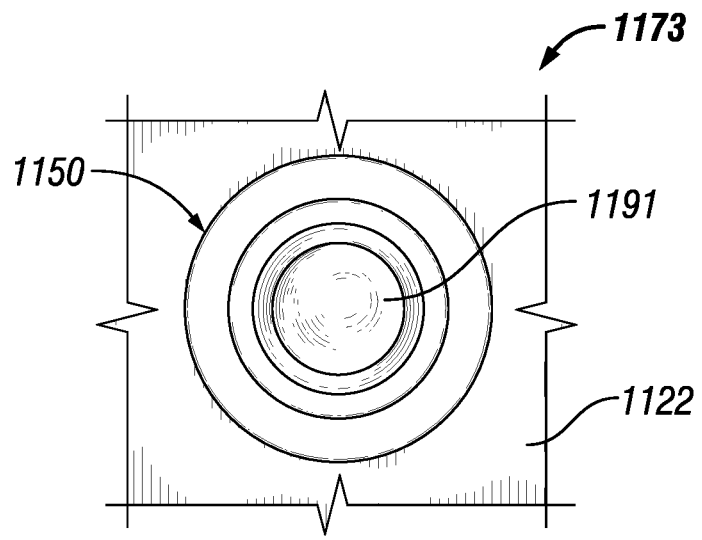
FIG. 11 shows yet another sensor device with a signal guide in accordance with certain example embodiments.
Figure 12:
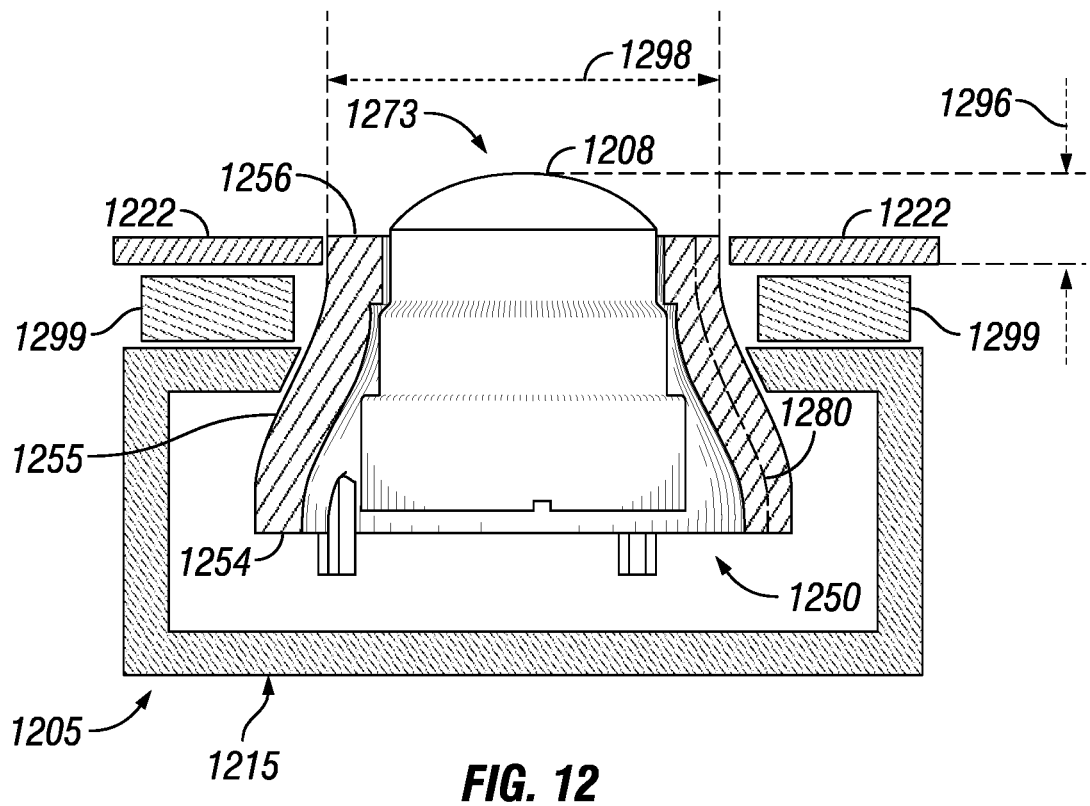
FIG. 12 shows the sensor of FIGS. 10A and 10B mounted in a surface in accordance with certain example embodiments.

FIGS. 10A-12 show example embodiments where the sensor device is partially visible (as with FIGS. 1A-4B), but where the footprint of the visible portion of the sensor device is significantly less than what can be accomplished in the current art. FIG. 10A shows a top view of a signal guide 1050 of a sensor device in accordance with certain example embodiments. FIG. 10B shows a top view of a distal assembly 1073, including the signal guide 1050 of FIG. 10A, of a sensor device. FIG. 11 shows a top view of a distal assembly 1190, including a signal guide 1150, of a sensor device. FIG. 12 shows a cross-sectional side view that details sensor device 1205 disposed on an outer panel 1222 of an electrical device 1292.

Referring to FIGS. 1A-12, the signal guide 1050 of FIG. 10A has one or more main channels 1083 that are non-linear. In other words, the one or more distal apertures 1056 at the distal end of the main channels 1055 of the signal guide 1050 are spaced adjacent to the aperture 1086 disposed in the middle of the signal guide 1050, where the radius of the distal apertures 1056 is smaller than the radius of the proximal apertures (hidden from view in FIG. 10A, but shown as proximal apertures 1254 in FIG. 12) disposed at the proximal end of the main channels 1055. Put another way, the signal guides of FIGS. 10A-12 can be modified version of the signal guide 650 of FIG. 6, where the distal end of the signal guides in FIGS. 10A-12 are squeezed inward (e.g., smaller diameter), thus creating a smaller profile. Thus, the energy waves or other signals that travel through the signal guide 1050 travel in a non-linear path. Again, as shown in FIGS. 10B-12, this greatly reduces the footprint of the distal assembly (distal assembly 1073 in FIG. 10B, distal assembly 1173 in FIG. 11, and distal assembly 1273 in FIG. 12) that is visible to a user.

FIG. 11 shows an alternative sensor device where the occupancy sensor (including the occupancy sensor housing 1008 shown in FIG. 10B) is replaced by a camera 1191. FIG. 12 shows an example of how the sensor device 1205 can be mounted to an electrical device 1292. In this case, the sensor device 1205 does not have a trim (such as trim 404 in FIG. 4B above). Instead, a coupling device 1299 (e.g., double-sided tape, adhesive, epoxy, cement, glue) can be used to secure the housing 1215 of the sensor device 1205 to the inner-facing surface of the outer panel 1222 of the electrical device 1292. Without the trim, footprint of the distal assembly 1273 is greatly reduced compared to the footprint of the distal assembly 403 of FIG. 4B above.

Specifically, the distal end 1251 of the signal guide 1250 has a width 1298 (e.g., 0.5 inches) and a height 1296 (e.g., 0.15 inches). The width 1298 of the distal end 1251 of the signal guide 1250 is less than the width of the cover 401 of FIG. 4B above. In other words, the bell-shape of the signal guide 1250 (including the continuous channel 1280 that runs along the length of the signal guide 1250) allows for a smaller visible footprint for a sensor device. In addition, the shape and/or size of portions of a sensor device that would currently be too large to be used with an electrical device can be used with example embodiments because of the smaller footprint and/or the flexibility in placement of the sensor device.

Example embodiments provide a number of benefits. Examples of such benefits include, but are not limited to, reduction in visible footprint; more simplistic installation, replacement, modification, and maintenance of a sensor device; improved aesthetics; ability to transmit energy waves in two directions rather than just one direction; compliance with one or more applicable standards and/or regulations; lower maintenance costs, increased flexibility in system design and implementation; and reduced cost of labor and materials. Example embodiments can be used for installations of new electrical devices and/or new sensor devices. Example embodiments can also be integrated (e.g., retrofitted) with existing electrical devices and/or sensor devices.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A signal guide for a sensor device of a light fixture, the signal guide comprising:
a base comprising at least one proximal aperture, wherein the at least one proximal aperture is configured to be disposed proximate to at least one transceiver of the sensor device, wherein the sensor device measures at least one parameter used to operate the light fixture for illuminating a volume of space;
a body disposed adjacent to the base, wherein the body comprises at least one main channel, wherein the at least one main channel is defined at a proximal end by the at least one proximal aperture; and
a distal end disposed adjacent to the body opposite the base, wherein the distal end comprises at least one distal aperture, wherein the at least one distal aperture defines a distal end of the at least one main channel, wherein the at least one distal end, the at least one main channel, and the at least one proximal aperture are configured to transmit at least one signal between the at least one transceiver and an ambient environment,
wherein the distal end is within a line of sight to a field of control in the ambient environment, wherein the field of control is a subset of the ambient environment,
wherein the distal end is configured to independently receive an ambient signal that originates within the field of control and fail to receive another ambient signal that originates outside the field of control,
wherein the ambient signal is configured to travel through the body and the base, wherein the body has a first cross-sectional shape and size that differs from a second cross-sectional shape and size of the base or the distal end so that the ambient signal that originates within the field of control is received and so that the another ambient signal that originates outside the field of control is not received,
wherein the first cross-sectional shape and size and the second cross-sectional shape and size are configured to define the field of control, and
wherein the at least one proximal aperture, the at least one main channel, and the at least one distal aperture are configured to deliver an undistorted version of the ambient signal from the field of control to the sensor device so that the sensor device accurately measures the at least one parameter.

2. The signal guide of claim 1, wherein the at least one proximal aperture, the at least one main channel, and the at least one distal aperture are further configured to transmit at least one sensor signal that originates from the at least one transceiver of the sensor device to the ambient environment.

3. The signal guide of claim 1, wherein the at least one distal aperture, the at least one main channel, and the at least one proximal aperture form a continuous channel.

4. The signal guide of claim 1, wherein the at least one main channel comprises material that transmits the ambient signal between the at least one distal aperture and the at least one proximal aperture of a plurality of proximal apertures with substantially no loss or distortion.

5. The signal guide of claim 1, wherein the at least one distal aperture comprises a plurality of distal apertures that are configured linearly with respect to each other at the distal end.

6. The signal guide of claim 1, wherein the at least one main channel comprises a plurality of main channels, wherein the at least one proximal aperture comprises a plurality of proximal apertures, wherein each of the plurality of main channels and the plurality of proximal apertures are physically separated from each other within the body.

7. The signal guide of claim 6, wherein the body has at least one physical gap separating the plurality of main channels and the plurality of proximal apertures.

8. The signal guide of claim 1, wherein the at least one main channel is non-linear.

9. The signal guide of claim 1, wherein the at least one distal aperture is substantially contiguous when the at least one distal aperture is a plurality of distal apertures.

10. A sensor device subassembly for a light fixture used to illuminate a volume of space, comprising:
at least one sensor comprising at least one transceiver, wherein the at least one transceiver sends or receives at least one signal, and wherein the at least one sensor measures at least one parameter used to operate the light fixture; and
a signal guide disposed adjacent to the at least one transceiver, wherein the signal guide comprises:
a base comprising at least one proximal aperture, wherein the at least one proximal aperture is disposed proximate to the at least one transceiver of the at least one sensor;
a body disposed adjacent to the base, wherein the body comprises at least one main channel that is defined at a proximal end by the at least one proximal aperture; and
a distal end disposed adjacent to the body opposite the base of the signal guide, wherein the distal end comprises at least one distal aperture that defines a distal end of the at least one main channel, wherein the at least one distal aperture, the at least one main channel, and the at least one proximal aperture transmit the at least one signal between the at least one transceiver and an ambient environment,
wherein the distal end is within a line of sight to a field of control in the ambient environment, wherein the field of control is a subset of the ambient environment,
wherein the distal end is configured to independently receive an ambient signal that originates within the field of control and fail to receive another ambient signal that originates outside the field of control,
wherein the ambient signal is configured to travel through the body and the base, wherein the body has a first cross-sectional shape and size that differs from a second cross-sectional shape and size of the base or the distal end so that the ambient signal that originates within the field of control is received and so that the another ambient signal that originates outside the field of control is not received,
wherein the first cross-sectional shape and size and the second cross-sectional shape and size are configured to define the field of control, and
wherein the at least one proximal aperture, the at least one main channel, and the at least one distal aperture are configured to deliver an undistorted version of the ambient signal from the field of control to the at least one sensor so that the at least one sensor accurately measures the at least one parameter.

11. The sensor device subassembly of claim 10, wherein the at least one sensor transmits at least one sensor signal through the signal guide.

12. A sensor device for a light fixture, comprising:
a first sensor comprising a first transceiver, wherein the first transceiver sends or receives a first plurality of ambient signals associated with a first parameter used by the light fixture, wherein the light fixture illuminates a volume of space;
a second sensor comprising a second transceiver, wherein the second transceiver sends or receives a second plurality of ambient signals associated with a second parameter used to operate the light fixture for illuminating the volume of space;
a signal guide disposed adjacent to the first transceiver and the second transceiver, wherein the signal guide comprises:
a base comprising a first proximal aperture and a second proximal aperture, wherein the first proximal aperture is disposed proximate to the first transceiver of the first sensor, and wherein the second proximal aperture is disposed proximate to the second transceiver of the second sensor;
a body disposed adjacent to the base, wherein the body comprises a first main channel and a second main channel, wherein the first main channel is adjacent to and contiguous with the first proximal aperture, wherein the second main channel is adjacent to and contiguous with the second proximal aperture; and
a distal end disposed adjacent to the body opposite the base, wherein the distal end is exposed to an ambient environment and comprises a first distal aperture and a second distal aperture, wherein the first distal aperture is adjacent to and contiguous with the first main channel, and wherein the second distal aperture is adjacent to and contiguous with the second main channel; and
an operational device comprising a device aperture, wherein the distal end of the signal guide is disposed adjacent to the device aperture,
wherein the first distal aperture is within a first line of sight to a first field of control in the ambient environment, wherein the second distal aperture is within a second line of sight to a second field of control, wherein the first field of control and the second field of control are a subset of the ambient environment,
wherein the first distal aperture is configured to transceive the first plurality of ambient signals that originate from within the field of control and fail to transceive other ambient signals that originate outside the field of control, wherein the first main channel has a first cross-sectional shape and size that differs from a second cross-sectional shape and size of the first proximal aperture or the first distal aperture so that the ambient signal that originates within the first field of control is received and so that the another ambient signal that originates outside the first field of control is not received,
wherein the first cross-sectional shape and size and the second cross-sectional shape and size are configured to define the first field of control, and
wherein the first plurality of ambient signals is configured to travel through the first main channel of the body and the first proximal aperture of the base, wherein the first proximal aperture of the base is configured to transceive an undistorted version of the first plurality of ambient signals with the first sensor, wherein the second distal aperture is configured to transceive the second plurality of ambient signals that originate from within the second field of control, wherein the second plurality of ambient signals is configured to travel through the second main channel of the body and the second proximal aperture of the base, wherein the second proximal aperture of the base is configured to transceive an undistorted version of the second plurality of ambient signals with the second sensor.

13. The sensor device of claim 12, wherein the operational device is a light fixture.

14. The sensor device of claim 13, wherein the first sensor, the second sensor, and at least a portion of the signal guide are hidden from view of a user by the operational device.

15. The sensor device of claim 12, wherein the operational device is controlled using the first sensor based on the first plurality of signals transmitted through the signal guide.

16. The sensor device of claim 12, wherein the first sensor comprises a light source, wherein the first transceiver emits light through the first proximal aperture, the first main channel, and the first distal aperture to a volume of space outside of the operational device.

17. The sensor device of claim 16, wherein the second sensor comprises a light detector, wherein the second plurality of signals comprises ambient light, wherein the second transceiver receives the ambient light at the second proximal aperture after the ambient light travels through the second distal aperture and the second main channel.

* * * * *